(12) United States Patent
Choi et al.

(10) Patent No.: US 10,640,839 B2
(45) Date of Patent: May 5, 2020

(54) LOW-ALLOY AND CORROSION-RESISTANT STEEL FOR VEHICLE, HAVING IMPROVED CORROSION RESISTANCE UNDER CORROSIVE ENVIRONMENT, AND PREPARATION METHOD THEREOF

(71) Applicants: Hyundai Motor Company, Seoul (KR); Kia Motors Corporation, Seoul (KR); Hyundai Steel Company, Incheon (KR)

(72) Inventors: Jae-Woong Choi, Seongnam-si (KR); Won-Seok Yang, Dangjin-si (KR)

(73) Assignees: Hyundai Motor Company, Seoul (KR); Kia Motors Corporation, Seoul (KR); Hyundai Steel Company, Incheon (KR)

( * ) Notice: Subject to any disclaimer, the term of this patent is extended or adjusted under 35 U.S.C. 154(b) by 0 days.

(21) Appl. No.: 15/800,500

(22) Filed: Nov. 1, 2017

(65) Prior Publication Data

US 2018/0327877 A1   Nov. 15, 2018

(30) Foreign Application Priority Data

May 10, 2017 (KR) .................. 10-2017-0058061

(51) Int. Cl.
*B32B 15/01* (2006.01)
*C21D 8/00* (2006.01)
(Continued)

(52) U.S. Cl.
CPC ............ *C21D 8/005* (2013.01); *B32B 15/012* (2013.01); *C21D 6/004* (2013.01); *C21D 6/005* (2013.01); *C21D 6/008* (2013.01); *C22C 21/02* (2013.01); *C22C 38/002* (2013.01); *C22C 38/008* (2013.01); *C22C 38/02* (2013.01); *C22C 38/04* (2013.01); *C22C 38/42* (2013.01); *C22C 38/48* (2013.01); *C23C 2/12* (2013.01);
(Continued)

(58) Field of Classification Search
None
See application file for complete search history.

(56) References Cited

U.S. PATENT DOCUMENTS 6,649,282 B1 * 11/2003 Yamaguchi ............. C22C 13/00
428/621
6,962,631 B2 * 11/2005 Sugiura .................. C21D 1/185
148/320

(Continued)

FOREIGN PATENT DOCUMENTS

JP          2011246744       * 12/2011

*Primary Examiner* — Daniel J. Schleis
(74) *Attorney, Agent, or Firm* — Morgan, Lewis & Bockius LLP

(57) ABSTRACT

A low-alloy and corrosion-resistant steel for a vehicle, may include about 0.001 wt % to about 0.1 wt % of C, about 0.01 wt % to about 0.5 wt % of Si, about 0.1 wt % to about 0.6 wt % of Mn, more than 0 wt % and about 0.18 wt % or less of P, more than 0 wt % and less than about 0.02 wt % of S, about 0.001 wt % to about 0.03 wt % of Nb, more than 0 wt % and about 0.03 wt % or less of Cr, about 0.05 wt % to about 0.3 wt % of Cu, about 0.05 wt % to about 0.2 wt % of Ni, and more than 0 wt % and about 0.2 wt % or less of a combined weight of Sn and Sb, and the balance iron and inevitable impurities.

17 Claims, 18 Drawing Sheets

(51) Int. Cl.
*C23C 2/12* (2006.01)
*C23C 2/28* (2006.01)
*C21D 6/00* (2006.01)
*C22C 21/02* (2006.01)
*C22C 38/00* (2006.01)
*C22C 38/02* (2006.01)
*C22C 38/04* (2006.01)
*C22C 38/42* (2006.01)
*C22C 38/48* (2006.01)
*C23C 18/16* (2006.01)
*C23C 18/48* (2006.01)
*C23G 1/08* (2006.01)
C25D 7/04 (2006.01)
C25D 3/66 (2006.01)

(52) U.S. Cl.
CPC ............ *C23C 2/28* (2013.01); *C23C 18/1637* (2013.01); *C23C 18/1692* (2013.01); *C23C 18/48* (2013.01); *C23G 1/08* (2013.01); C21D 2211/005 (2013.01); C25D 3/66 (2013.01); C25D 7/04 (2013.01); Y10T 428/12757 (2015.01)

(56) References Cited

U.S. PATENT DOCUMENTS

2016/0010172 A1\* 1/2016 Holleck .................... C22B 9/10
  420/128
2016/0304982 A1\* 10/2016 Makimizu ................. C23C 2/02

\* cited by examiner

LOW-ALLOY AND CORROSION-RESISTANT STEEL FOR VEHICLE, HAVING IMPROVED CORROSION RESISTANCE UNDER CORROSIVE ENVIRONMENT, AND PREPARATION METHOD THEREOF

CROSS-REFERENCE TO RELATED APPLICATIONS

The present application claims under 35 U.S.C. § 119(a) the benefit of Korean Patent Application No. 10-2017-0058061, filed on May 10, 2017, the entire contents of which is incorporated herein for all purposes by this reference in its entirety.

BACKGROUND OF THE INVENTION

Field of the Invention

The present invention relates to a low-alloy and corrosion-resistant steel for a vehicle and a preparation method thereof, and more particularly, to a low-alloy and corrosion-resistant steel for a vehicle, which improves corrosion resistance of a vehicle under a corrosive environment and reduces noise and vibration by controlling an alloy component of a steel material and a plating thereof and a preparation process thereof, and a preparation method thereof.

Description of Related Art

A muffler whose temperature is increased by high-temperature exhaust gases from an internal combustion engine of a vehicle is rapidly cooled by an ambient temperature when the engine is stopped running. Thereafter, the high-temperature exhaust gases present inside the muffler are changed into condensate water by cooling, and the exhaust gas components and some materials coming in from the outside form a strong acid environment in which sulfuric acid, nitric acid, hydrochloric acid, and the like are mixed in the internal combustion engine of the vehicle.

Generally, as a vehicle repeats running and stopping, and condensate water formed by cooling of the exhaust gases caused by the repetition of running and stopping is concentrated, the acid concentration increases. In the end, the concentrated condensate water accelerates corrosion of metal on the vehicle. In parts of the vehicle where the concentrated condensate water is present, highly corrosion-resistant 400-series or 300-series stainless steel is generally used.

Alloy steel, which can be applied to a preheater, a heat exchanger, or a chimney flue of a thermal power plant, is exchanged after a predetermined time elapses, and another alloy steel, which can be prepared by adding an alloy component of 3 wt % or less, is applied to such parts. However, such alloy steel is used in a power plant that is operated continuously at a predetermined temperature, such as a temperature of about 200° C. or less for the thermal power plant.

It is important to note that the corrosive environment of a vehicle is completely different from a corrosive environment of a typical thermal power plant. When more specifically examined, the temperature generated when a vehicle is driven is −40° C. to 400° C., and also the vehicle is operated repeatedly and discontinuously for several minutes to several hours. In other words, the corrosive environment of the vehicle occurs under more rigorous conditions than the corrosive environment of the power plant, and the vehicle's corrosive environment is significantly affected by ambient conditions.

Thus, for vehicle exhaust parts it is difficult to use an alloy steel, which is resistant to a corrosive environment of condensed sulfuric acid because automobile exhaust parts are exposed to a corrosive environment caused by condensate water being various mixed acids and a corrosive environment occurring during the running process. Further, when the alloy steel is applied to only some parts among constituent parts of a muffler under the environment, galvanic corrosion can occur while stainless steel is brought into contact with steel. Also, a steel material when used as a part for a vehicle can be problematic and/or undesirable when vehicle performance such as noise or allophone is considered.

Therefore, the present invention is intended to provide a low-alloy and corrosion-resistant steel for a vehicle, which has improved corrosion resistance, and excellent part moldability as compared to STS 409L- or STS 439L-series steel in the related art under a corrosive environment occurring due to exhaust gases of a vehicle. In addition the low-alloy and corrosion-resistant steel may reduce noise generation and may reduce the occurrence of galvanic corrosion even though the low-alloy and corrosion-resistant steel is brought into contact with stainless steel. Also provided herein is a preparation method of such as a low-alloy and corrosion-resistant steel for a vehicle.

BRIEF SUMMARY

Various aspects of the present invention are directed to providing a low-alloy and corrosion-resistant steel for a vehicle to improve corrosion resistance under a corrosive environment in which condensed corrosive water generated by exhaust gases of a vehicle is present.

The present invention, in various aspects, has also been made in an effort to provide a method for preparing a low-alloy and corrosion-resistant steel for a vehicle, which improves corrosion resistance and reduces noise and vibration by adjusting the rolling temperature, cooling rate, reduction ratio, and the like of the preparation process of a low-alloy and corrosion-resistant steel for a vehicle.

The technical problems which the present invention intends to solve are not limited to the technical problems which have been mentioned above, and still other technical problems which have not been mentioned will be apparently understood by a person with ordinary skill in the art from the description of the present invention.

Various aspects of the present invention are directed to providing a low-alloy and corrosion-resistant steel for a vehicle, including about 0.001 wt % to about 0.1 wt % of carbon (C), about 0.01 wt % to about 0.5 wt % of silicon (Si), about 0.1 wt % to about 0.6 wt % of manganese (Mn), more than 0 wt % and about 0.18 wt % or less of phosphorus (P), more than 0 wt % and less than about 0.02 wt % of sulfur (S), about 0.001 wt % to about 0.03 wt % of niobium (Nb), more than 0 wt % and about 0.03 wt % or less of chromium (Cr), about 0.05 wt % to about 0.3 wt % of copper (Cu), about 0.05 wt % to about 0.2 wt % of nickel (Ni), and more than 0 wt % and about 0.2 wt % or less of a combined weight of tin (Sn) and antimony (Sb), and the balance iron and inevitable impurities.

In various exemplary embodiments, the low-alloy and corrosion-resistant steel has a tensile strength of about 350 MPa to about 450 MPa.

In various exemplary embodiments, the low-alloy and corrosion-resistant steel has a yield point of about 200 MPa to about 00 MPa.

In various exemplary embodiments, the low-alloy and corrosion-resistant steel has an elongation of about 30% to about 45%.

In various exemplary embodiments, a microstructure of the low-alloy and corrosion-resistant steel is ferrite.

In various exemplary embodiments, the low-alloy and corrosion-resistant steel is plated with a plating raw material.

In various exemplary embodiments, the low-alloy and corrosion-resistant steel has a plating thickness of about 1 μm to about 50 μm.

In various exemplary embodiments, the plating raw material includes more than 0 wt % and less than about 3 wt % of magnesium (Mg) and about 5 wt % to about 15 wt % of silicon (Si), and the balance aluminum (Al) and inevitable impurities.

In various exemplary embodiments, an amount of plating raw material plated onto the low-alloy and corrosion-resistant steel is about 10 g/m² to about 800 g/m².

Various aspects of the present invention are directed to providing a method for preparing a low-alloy and corrosion-resistant steel for a vehicle. The method includes: a hot-rolling step of hot-rolling the low-alloy and corrosion-resistant steel; an acid pickling step of removing iron oxides from the hot-rolled low-alloy and corrosion-resistant steel; and a cold-rolling step of cold-rolling the acid pickled low-alloy and corrosion-resistant steel.

In various exemplary embodiments, a structure in the hot-rolling step is ferrite pearlite (FP).

In various exemplary embodiments, a thickness in the hot-rolling step is about 3 mm to about 4 mm.

In various exemplary embodiments, a hydrochloric acid concentration in the acid pickling step is about 17% or more.

In various exemplary embodiments, a temperature in the acid pickling step is about 75° C. to about 85° C.

In various exemplary embodiments, an annealing temperature in the cold-rolling step is about 600° C. to about 860° C.

In various exemplary embodiments, a heat treatment method in the cold-rolling step is a batch annealing furnace (BAF) or a continuous annealing furnace (CAF).

In various exemplary embodiments of the present invention, the method further includes: a plating step of plating the low-alloy and corrosion-resistant steel after the cold-rolling step.

In various exemplary embodiments of the present invention, a plating temperature in the plating step is about 650° C. to about 670° C.

In various exemplary embodiments of the present invention, the method further includes: an alloying heat treatment step of heat-treating the plated low-alloy and corrosion-resistant steel at a temperature of about 690° C. to about 790° C. after the plating step.

A low-alloy and corrosion-resistant steel for a vehicle of the present invention has an effect of providing a low-alloy and corrosion-resistant steel for a vehicle to improve corrosion resistance under a corrosive environment in which condensed corrosive water generated by exhaust gases of a vehicle is present.

A method for preparing a low-alloy and corrosion-resistant steel for a vehicle according to an exemplary embodiment of the present invention has an effect of providing a method for preparing a low-alloy and corrosion-resistant steel for a vehicle, which improves corrosion resistance of a vehicle under a corrosive environment and reduces noise and vibration by controlling an alloy component of a steel material and a plating thereof and a preparation process thereof.

DETAILED DESCRIPTION

Figure 1:
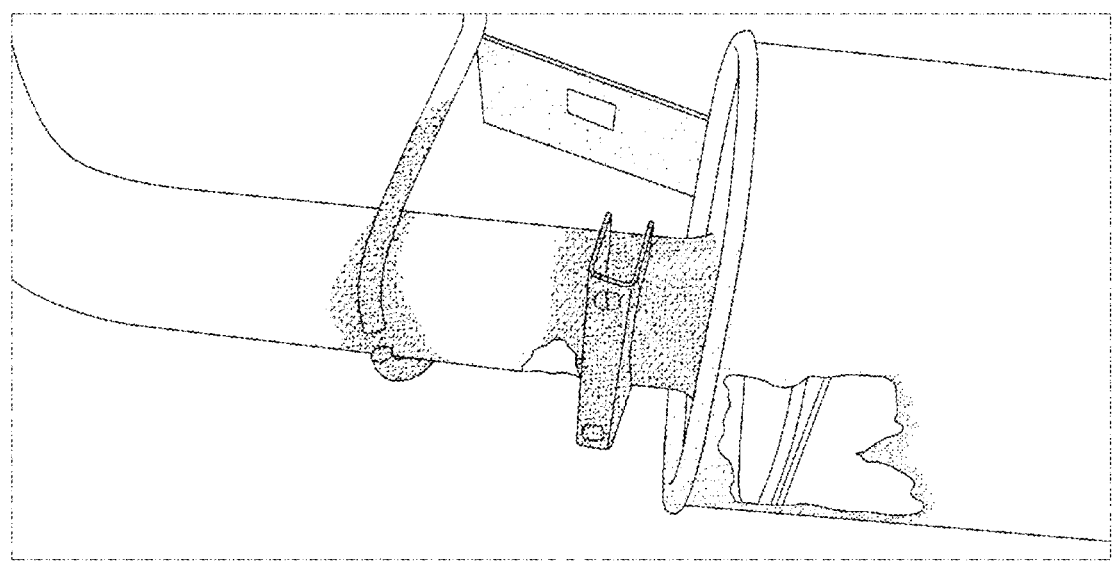
FIG. 1 is a photograph of a muffler formed of a low-alloy and corrosion-resistant steel for a vehicle according to the related art.

Hereinafter, various exemplary embodiments of the present invention will be described in detail with reference to the accompanying drawings. Prior to the description, the terms or words used in the present specification and the claims should not be construed as being limited as typical or dictionary meanings, and should be construed as meanings and concepts conforming to the technical spirit of the present invention on the basis of the principle that an inventor can appropriately define concepts of the terms in order to describe his or her own invention in the best way. Accordingly, since the examples described in the present specification and the configurations illustrated in the drawings are only an exemplary embodiment of the present invention and do not represent all of the technical spirit of the present invention, it is to be understood that various equivalents and modified examples, which may replace the these examples and configurations, are possible at the time of filing the present application.

Various aspects of the present invention are directed to providing a low-alloy and corrosion-resistant steel for a vehicle, wherein the steel has improved corrosion resistance under a condensate water corrosive environment, and a preparation method thereof. In one aspect, various aspects of the present invention are directed to providing a low-alloy and corrosion-resistant steel for a vehicle, having improved corrosion resistance under a corrosive environment.

When specifically examined, a thermal power plant is generally consistently and continuously operated for the generation of power. As such, the environment where corrosion occurs due to exhaust gases is maintained at about 200° C. and under predetermined and predictable conditions. Ultimately, in the case of parts exposed to such exhaust gases released from a thermal power plant, parts capable of withstanding predetermined conditions, e.g., a predetermined temperature and a predetermined acid concentration, are applied, and the problem is solved by a method of exchanging the parts after a predetermined time has elapsed.

On the other hand, a vehicle is driven repeatedly and discontinuously according to the driver's needs, and furthermore, the driving time is not constant or predictable. Furthermore, the temperature of exhaust parts and the like, which is formed when a vehicle is driven, reaches a temperature of about 400° C. or more, and is reduced to about −40° C. or less according to the ambient temperature after the driving is stopped. Thus, the temperature conditions applied to a vehicle exhaust system is more rigorous than the conditions of a thermal power plant. Ultimately, the corrosive environment of a vehicle experiences more significant changes in temperature and the like than the corrosive environments of a thermal power plant, and the corrosive environment of the vehicle is significantly affected by the ambient environment because the vehicle is a transportation means.

Typically, acidic condensate water generated by cooling of exhaust gases from a vehicle is produced when a gas such as $SO_X$, Cl or $NO_X$ is changed into a strong acid such as $H_2SO_4$, HCl, and $HNO_3$ by means of combination with moisture in the process where the gas is condensed by the ambient environment, and parts of the vehicle are corroded by the condensate water. The condensate water can strongly corrode metals, and particularly, since the condensate water easily dissolves a chromium oxidation layer which is a passivity layer of stainless steel typically applied to the vehicle exhaust system. A perforation corrosion phenomenon can occur in which parts are rapidly perforated even in sulfuric acid condensate water having a concentration of about 10% or less as compared to the corrosive environment of a thermal power plant. FIG. 1 is a photograph of a muffler formed of a low-alloy and corrosion-resistant steel for a vehicle according to the related art. As illustrated in FIG. 1, it can be confirmed that condensate water produced by exhaust gases of a vehicle corrodes not only the surface of a muffler, but also the parts of the vehicle themselves, and as a result, a perforation corrosion phenomenon occurs.

It is important to note that as the temperature is increases, the corrosion rate increases as well. Generally, in the related art, the problem is solved by using stainless steel to which nickel (Ni) or molybdenum (Mo) is added in excess. However, the problem with this solution is that adding expensive Ni or Mo in excess dramatically increases the cost of stainless steel alloy, and furthermore, such exhaust system parts are easily corroded because corrosion resistance remains insufficient.

Accordingly, the present invention is intended to provide a sulfuric acid-resistant steel having more improved corrosion resistance and better economic efficiency than stainless steel 400-series being the related art under a corrosive environment caused by condensate water generated by exhaust gases of a vehicle, in which an aqueous sulfuric acid solution is the main component. That is, various aspects of the present invention are directed to providing a low-alloy and corrosion-resistant steel having reduced preparation costs and more improved corrosion resistance, welding easiness, and moldability than STS409L or STS439L, and the like in the related art because an alloy component added to an alloy steel to which carbon is added in a small amount is added in an amount of 3% or less.

Figure 2:
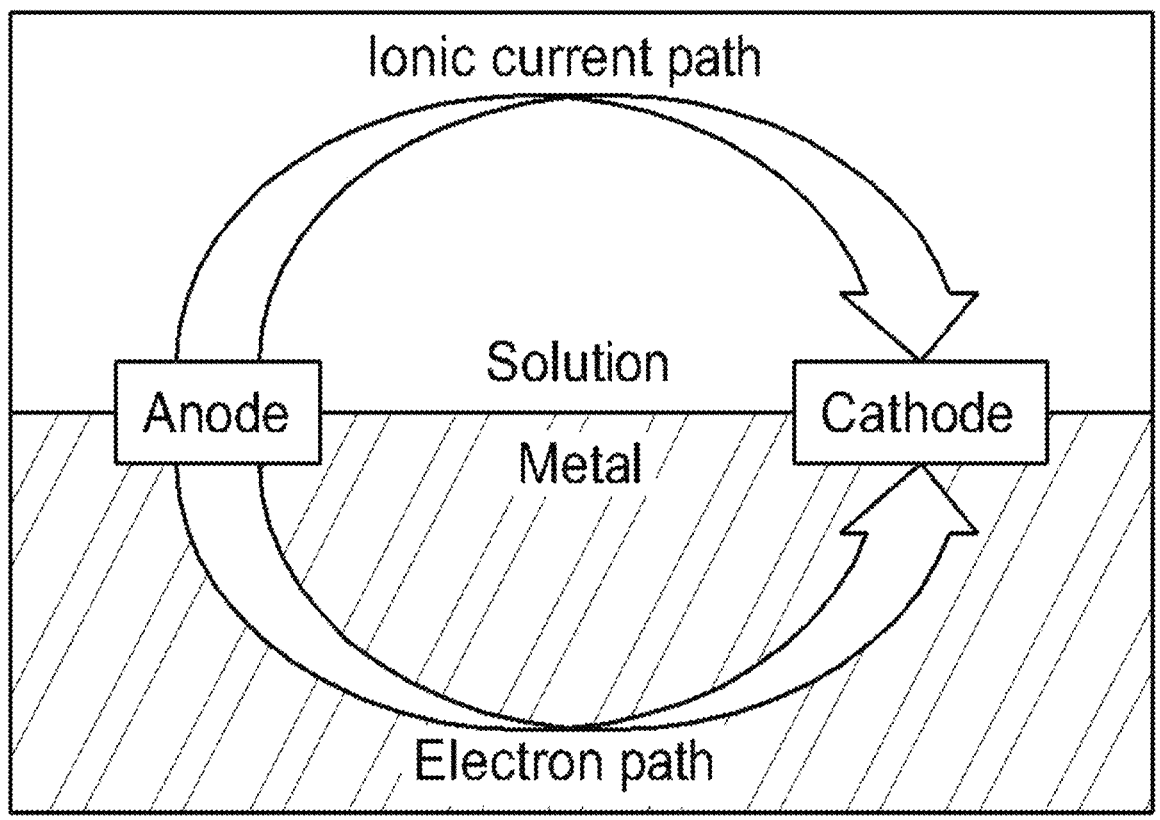
FIG. 2 is a schematic view illustrating the principle of corrosion.

The principle of corrosion is briefly summarized as follows. FIG. 2 is a schematic view illustrating the principle of corrosion. Corrosion consists of a combination of a negative electrode (cathode) and a positive electrode (anode) as illustrated in FIG. 2, and there is a need for an electrical connection or a mediator, which connects the two regions. There is no method capable of thermodynamically preventing corrosion. However, when corrosion is approached in terms of kinetics, the rate at which corrosion occurs, that is, the corrosion rate may be reduced, if necessary by controlling the cathode which consumes electrons formed from the anode, or controlling the electrical flow in which the anode is connected to the cathode or the flow of ions which are an inducing material, or controlling the concentration of a material generated while being corroded.

The corrosion rate formed by acid is overall affected by a material for a part, the ambient environment, a shape of a part, and the like. In an aqueous solution, an effect such as the concentration of a hydrogen ion ($H^+$), a counter anion of the hydrogen ion, temperature, other metal ions, a shape of a material, and a surface of a material also corresponds to an important factor. Metal salts or metal films formed by reacting the counter anions with the surface of the material may also appear differently. The effects of the composition, properties, compactness and saturation rate, dissolution rate, or mass transfer rate of the metal salts are greatly affected by the temperature, concentration, and rate of an electrolyte, the microstructure and component of a material, and the like.

Figure 3:
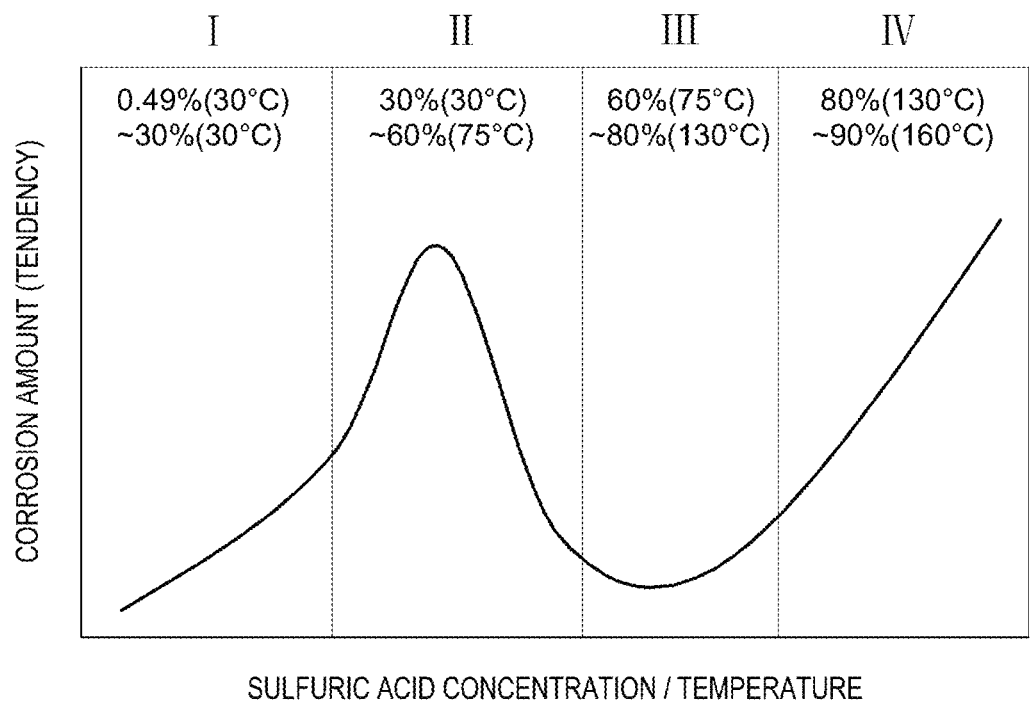
FIG. 3 is a schematic view illustrating the effect of sulfuric acid concentration and temperature on corrosion.

In particular, for the behavior of metal in an aqueous sulfuric acid solution, the surface reaction occurs complicatedly according to the concentration and temperature of sulfuric acid ions. In the aqueous sulfuric acid solution, the metal surface causes various hydrogen bonds or van der Waals bonds with O of $H_2O$, $SO_4^{2-}$, $HSO_4^-$, $H_2O$, $SO_4^{2-}$, and $H_2SO_4$. Since these ions exhibit high activity according to the temperature, the corrosion rate of metal is very greatly increased when the temperature of the aqueous solution is increased. FIG. 3 is a schematic view illustrating the effect of sulfuric acid concentration and temperature on corrosion. Kubota et al. (Nippon Kokan Technical Report No. 44 (1968) p. 140) largely marked corrosion regions in sulfuric acid with four steps, and classified the corrosion rates according to the temperature and concentration, as illustrated in FIG. 3. In the I region in FIG. 3, the corrosion rate is not significantly changed according to the concentration, but when the temperature is increased, the tendency easily moves to the II region where the corrosion rate is significantly increased.

Accordingly, it is preferred that in consideration of factors which affect the corrosion rate, materials, the surface quality, and the preparation process, the present invention includes about 0.001 wt % to about 0.1 wt % (e.g., about 0.001 wt % to about 0.1 wt %, about 0.005 wt % to about 0.1 wt %, about 0.01 wt % to about 0.1 wt %, about 0.02 wt % to about 0.1 wt %, about 0.03 wt % to about 0.1 wt %, about 0.04 wt % to about 0.1 wt %, about 0.05 wt % to about 0.1 wt %, about 0.06 wt % to about 0.1 wt %, about 0.07 wt % to about 0.1 wt %, about 0.09 wt % to about 0.1 wt %, about 0.09 wt % to about 0.1 wt %, about 0.001 wt % to about 0.01 wt %, about 0.001 wt % to about 0.05 wt %, or about 0.001 wt % to about 0.09 wt %) of C, about 0.01 wt % to about 0.5 wt % (e.g., about 0.01 wt % to about 0.5 wt %, about 0.01 wt % to about 0.4 wt %, about 0.01 wt % to about 0.3 wt %, about 0.01 wt % to about 0.2 wt %, about 0.01 wt % to about 0.1 wt %, about 0.05 wt % to about 0.1 wt %, about 0.05 wt % to about 0.2 wt %, about 0.05 wt % to about 0.3 wt %, about 0.05 wt % to about 0.4 wt %, or about 0.05 wt % to about 0.5 wt %) of Si, about 0.1 wt % to about 0.6 wt % (e.g., about 0.1 wt %, about 0.2 wt %, about 0.3 wt %, about 0.4 wt %, about 0.5 wt %, or about 0.6 wt %,) of Mn, more than 0 wt % and about 0.18 wt % or less (e.g., about 0.18 wt %, about 0.17 wt %, about 0.16 wt %, about 0.15 wt %, about 0.14 wt %, about 0.13 wt %, about 0.12 wt %, about 0.11 wt %, about 0.10 wt %, about 0.09 wt %, about 0.08 wt %, about 0.07 wt %, about 0.06 wt %, about 0.05 wt %, about 0.01 wt %, about 0.005 wt %, 0.001 wt %, or less) of P, more than 0 wt % and less than about 0.02 wt % (e.g., about 0.02 wt %, about 0.01 wt %, about 0.009 wt %, about 0.008 wt %, about 0.007 wt %, about 0.006 wt %, about 0.005 wt %, about 0.004 wt %, about 0.003 wt %, about 0.002 wt %, about 0.001 wt %, or less) of S, about 0.001 wt % to about 0.03 wt % (e.g., about 0.001 wt % to about 0.03 wt %, about 0.005 wt % to about 0.03 wt %, about 0.009 wt % to about 0.03 wt %, about 0.01 wt % to about 0.03 wt %, about 0.021 wt % to about 0.03 wt %, about 0.001 wt % to about 0.02 wt %, about 0.001 wt % to about 0.02 wt %, or about 0.001 wt % to about 0.01 wt %) of Nb, more than 0 wt % and about 0.03 wt % or less (e.g., about 0.03 wt %, about 0.02 wt %, about 0.01 wt %, about 0.009 wt %, about 0.008 wt %, about 0.007 wt %, about 0.006 wt %, about 0.005 wt %, about 0.004 wt %, about 0.003 wt %, about 0.002 wt %, about 0.001 wt %, or less) of Cr, about 0.05 wt % to about 0.3 wt % (e.g., about 0.05 wt % to about 0.3 wt %, about 0.05 wt % to about 0.2 wt %, about 0.05 wt % to about 0.1 wt %, about 0.05 wt % to about 0.09 wt %, about 0.05 wt % to about 0.08 wt %, about 0.05 wt % to about 0.07 wt %, about 0.05 wt % to about 0.06 wt %, about 0.05 wt % to about 0.2 wt %, about 0.05 wt % to about 0.1 wt %, about 0.1 wt % to about 0.3 wt %, or about 0.2 wt % to about 0.3 wt %) of Cu, about 0.05 wt % to about 0.2 wt % (e.g., about 0.05 wt % to about 0.2 wt %, about 0.05 wt % to about 0.1 wt %. about 0.05 wt % to about 0.09 wt %, about 0.05 wt % to about 0.08 wt %, about 0.05 wt % to about 0.07 wt %, about 0.05 wt % to about 0.06 wt %, or about 0.1 wt % to about 0.2 wt %) of Ni, and more than 0 wt % and about 0.2 wt % or less (e.g., about 0.2 wt %, about 0.1 wt %, about 0.09 wt %, about 0.08 wt %, about 0.07 wt %, about 0.06 wt %, about 0.05 wt %, about 0.04 wt %, about 0.03 wt %, about 0.02 wt %, about 0.01 wt %, about 0.005 wt %, about 0.001 wt %, or less) of a combined weight of Sn and Sb, and the balance iron and inevitable impurities.

It is preferred that the low-alloy and corrosion-resistant steel has a tensile strength of about 350 MPa to about 450 MPa (e.g., about 350 MPa, about 360 MPa, about 370 MPa, about 380 MPa, about 390 MPa, about 400 MPa, about 410 MPa, about 420 MPa, about 430 MPa, about 440 MPa, or about 450 MPa), it is preferred that the low-alloy and corrosion-resistant steel has a yield point of about 200 MPa to about 400 MPa (e.g., about 200 MPa to about 400 MPa, about 250 MPa to about 400 MPa, about 300 MPa to about 400 MPa. about 200 MPa to about 350 MPa. about 200 MPa to about 300 MPa, or about 200 MPa to about 250 MPa), it is preferred that the low-alloy and corrosion-resistant steel has an elongation of about 30% to about 45% (e.g., about 30%, about 31%, about 32%, about 33%, about 34%, about 35%, about 36%, about 37%, about 38%, about 39%, about 40%, about 41%, about 42%, about 43%, about 44%, or about 45%), and it is preferred that a microstructure of the low-alloy and corrosion-resistant steel is ferrite.

It is preferred that the low-alloy and corrosion-resistant steel is plated, it is preferred that the plating raw material includes more than 0 wt % and less than about 3 wt % (e.g., about 2.9 wt %, about 2.5 wt %, about 2.0 wt %, about 1.9 wt %, about 1.5 wt %, about 1.3 wt %, about 1.1 wt %, about 1.0 wt %, about 0.9 wt %, about 0.5 wt %, or less or more than 0 wt %) of Mg and 5 wt % to 15 wt % (e.g., about 5 wt %, about 6 wt %, about 7 wt %, about 8 wt %, about 9 wt %, about 10 wt %, about 11 wt %, about 12 wt %, about 13 wt %, about 14 wt %, or about 15 wt %) of Si, and the balance Al and inevitable impurities, and it is preferred that an amount of plating raw material plated onto the low-alloy and corrosion-resistant steel is about 10 $g/m^2$ to about 800 $g/m^2$ (e.g., about 10 $g/m^2$ to about 800 $g/m^2$, about 50 $g/m^2$ to about 800 $g/m^2$, about 100 $g/m^2$ to about 800 $g/m^2$, about 200 $g/m^2$ to about 800 $g/m^2$, about 300 $g/m^2$ to about 800 $g/m^2$, about 400 $g/m^2$ to about 800 $g/m^2$, about 500 $g/m^2$ to about 800 $g/m^2$, about 600 $g/m^2$ to about 800 $g/m^2$, about 700 $g/m^2$ to about 800 $g/m^2$, about 10 $g/m^2$ to about 20 $g/m^2$, about 10 $g/m^2$ to about 30 $g/m^2$, about 10 $g/m^2$ to about 40 $g/m^2$, about 10 $g/m^2$ to about 50 $g/m^2$, about 10 $g/m^2$ to about 60 $g/m^2$, about 10 $g/m^2$ to about 70 $g/m^2$, about 10 $g/m^2$ to about 80 $g/m^2$, about 10 $g/m^2$ to about 90 $g/m^2$, or about 10 $g/m^2$ to about 100 $g/m^2$).

When more specifically examined, a corrosive environment formed inside a muffler of a vehicle has a corrosion cycle of condensate water corrosion-high temperature oxidation. Accordingly, the corrosion control principle as follows is applied to the present invention.

First, corrosion resistance was improved by controlling condensate water, that is, condensate water including about 1% to about 10% (e.g., about 1%, about 2%, about 3%, about 4%, about 5%, about 6%, about 7%, about 8%, about 9%, or about 10%,) sulfuric acid and a trace amount of organic acid.

When more specifically examined, an anodic dissolution was suppressed in an exemplary embodiment of the present invention. When a material for a vehicle is exposed to a complex corrosive environment of condensate water, a thick $FeSO_4 \cdot SiO_2$ or Cu—Sb complex layer is formed, thereby reducing a material elution rate. Accordingly, Cu (reduction potential of Cu: 0.345 V) and Sb (reduction potential of Sb: 0.11 V) components having a higher reduction potential than 0 V which is a reduction potential of hydrogen are added to improve corrosion resistance under an environment in which hydrogen is generated. Furthermore, the cathodic control, that is, the addition of Sb and Sn, and the like is to add catalytic poison components, thereby increasing the hydrogen overvoltage. Specifically, for the corrosion of iron, hydrogen allows the corrosion to progress by consuming electrons generated from the anode. In this case, the overall corrosion rate may be lowered by suppressing hydrogen from being generated. That is, stability in an ion state is enhanced by increasing a low hydrogen overvoltage of iron to suppress electrons from being consumed in the cathode, and as a result, preventing corrosion. Further, an AlSi plating is designed so as to secure corrosion resistance at an extremely low concentration.

Next, the heat-oxidation shock is alleviated by improving the high-temperature oxidation resistance. When an aqueous solution disappears, iron is oxidized at high temperature under a corrosive environment caused by gas. Accordingly, when Si, which forms an oxidation film on the surface of iron, is added under a high-temperature corrosive environment, oxidation is suppressed at high temperature. Furthermore, when components having a large atomic radius and a low melting point, such as Sn and Sb are added in a trace amount, it is possible to suppress oxygen from permeating due to the blocking effect.

Next, the corrosion resistance is improved by controlling corrosion caused by contact of heterogeneous materials, that is, hetero-contact corrosion and corrosion occurring in crevices, that is, crevice corrosion, and the scale. In the parts of a vehicle, corrosion simply caused by condensate water does not only occur. Under a corrosive environment caused by condensate water generated inside a muffler of a vehicle, a crevice is present between shell-baffles or baffle-pipes. If the crevice is brought into contact with heterogeneous metals, galvanic corrosion, that is, corrosion caused by contact of heterogeneous metals, or local corrosion caused by crevice corrosion occurs, so that the corrosion rate under the environment is increased by 10 times to 100 times or more than the corrosion rate of the environment in which corrosion typically occurs. Further, when bare steel is used, there is a problem in that an extremely large amount of scales caused by corrosion are generated, and thus are highly likely to be generated as fine dust in exhaust gases. Accordingly, in order to solve the above-described problems, it is preferred to form an Al—Si plating having a thickness of about 1 μm to about 50 μm (e.g., about 1 μm to about 50 μm, about 10 μm to about 50 μm, about 20 μm to about 50 μm, about 30 μm to about 50 μm, about 40 μm to about 50 μm, about 1 μm to about 40 μm, about 1 μm to about 30 μm, about 1 μm to about 20 μm, or about 1 μm to about 10 μm) onto the low-alloy and corrosion-resistant steel of the present invention. For the Al—Si alloy, Fe components of the material are diffused at about 300° C. to about 450° C. (e.g., about 300° C. to about 450° C., about 350° C. to about 450° C., about 400° C. to about 450° C., about 300° C. to about 400° C., or about 300° C. to about 350° C.), which is a temperature at which a vehicle is running, and as a result, there is an effect of improving the corrosion resistance on the surface of a part because Al—Si oxides are formed on the top layer thereof, and the bottom layer of the top layer is Al—Fe alloyed.

Figure 4:
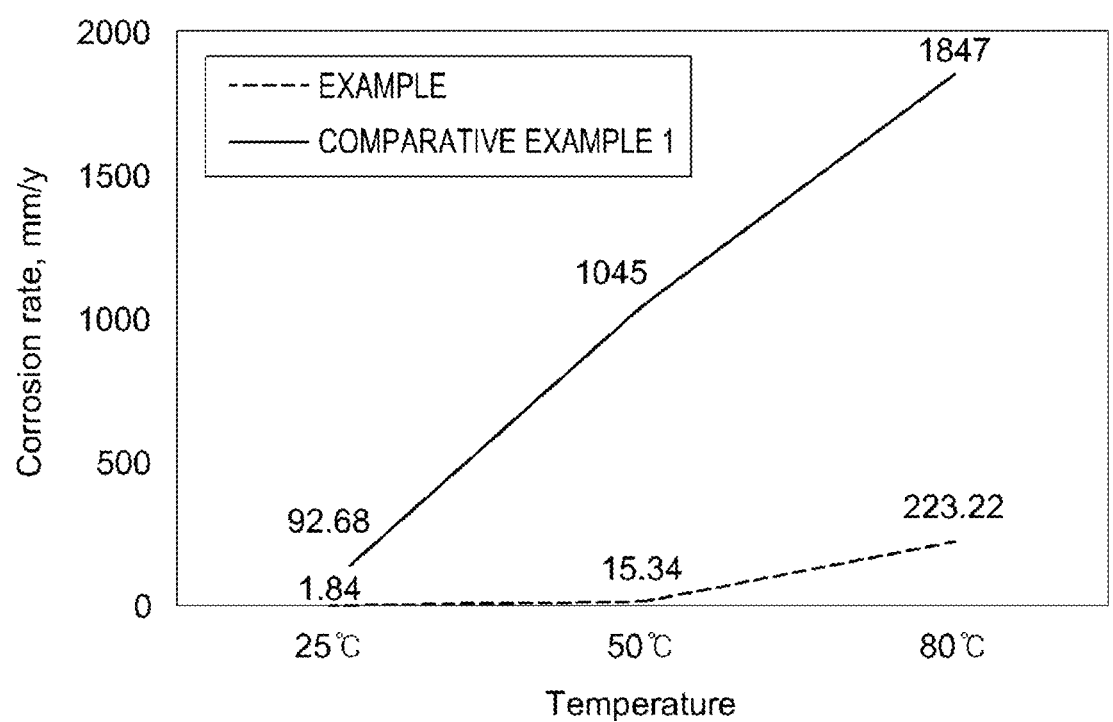
FIG. 4 is a graph illustrating the difference in corrosion resistance according to the presence and absence of Al—Si plating.

Meanwhile, FIG. 4 is a graph illustrating the difference in corrosion resistance according to the presence and absence of Al—Si plating, and compares the difference in corrosion resistance between Comparative Example 1 and an Example by using condensate water having a concentration of 10%. Comparative Example 1 is the case where Al—Si plating is not performed by using STS409L, and the Example is the case where Al—Si plating is performed. As described above, it can be confirmed through FIG. 4 that there is a significant difference in corrosion resistance between Comparative Example 1 and the Example. More specifically, it can be seen through FIG. 4 that Comparative Example 1 is different from the Example by about 9 times in the corrosion rate caused by an increase in temperature. That is, it can be said that the alloy according to the Example has an effect of improving corrosion resistance by means of the Al—Si plating.

Sn and Sb alloy components are added to the low-alloy and corrosion-resistant steel which is the present invention in order to strengthen a plating property of the Al—Si alloy. When components having a high atomic number and a low melting point, such as Sn and Sb are concentrated on the surface, there is an effect of improving the plating property by lowering the surface tension. In addition, it is possible to improve an effect of blocking oxygen which passes through the plating by imparting a blocking effect to the interface.

Next, the present invention improves the corrosion resistance by adding alloy components. When alloy components are added in order to improve the corrosion resistance, effects of an aqueous sulfuric acid solution on the corrosion resistance and effects of high temperature on the corrosion resistance are considered.

Figure 5:
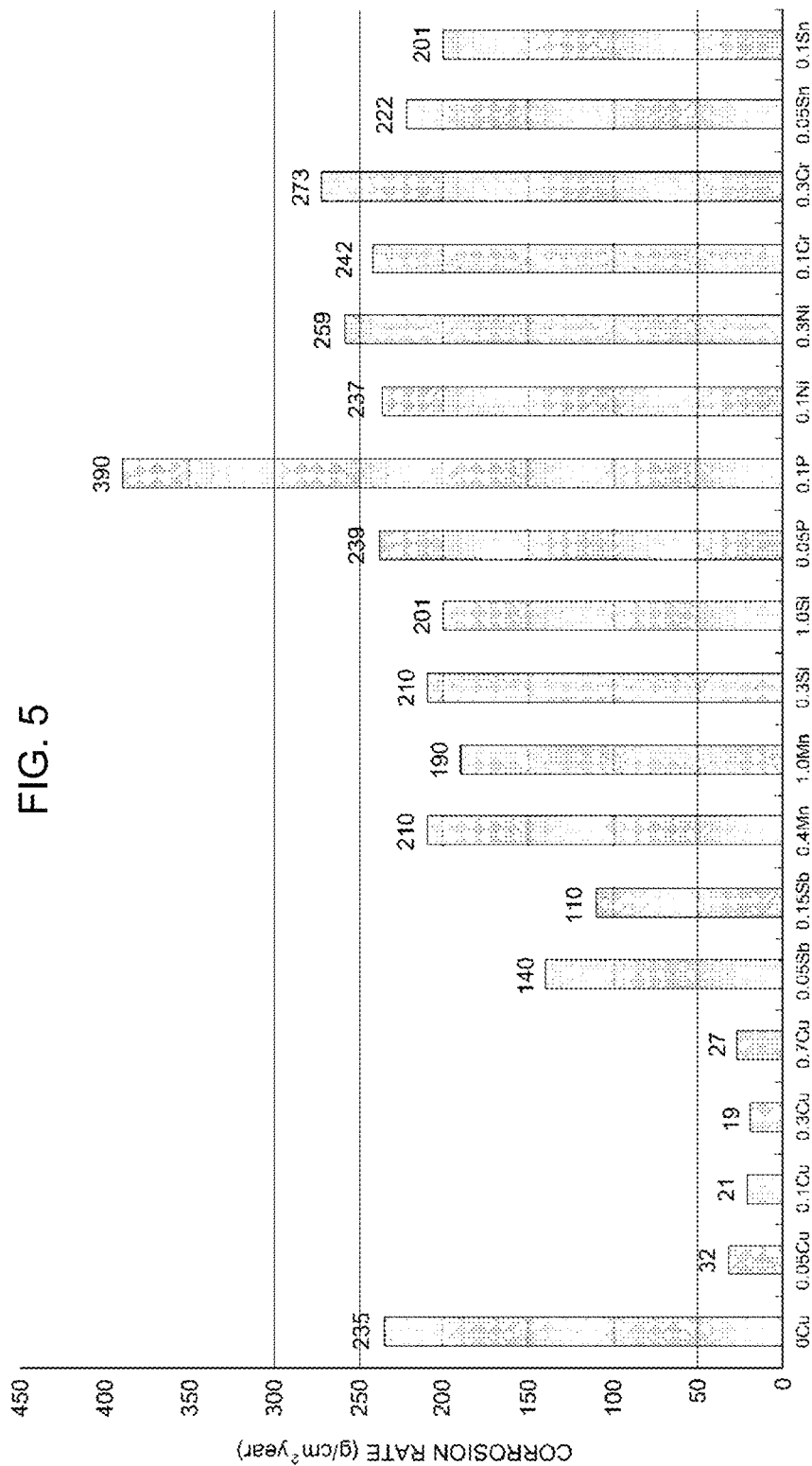
FIG. 5 is a graph illustrating the corrosion rate according to the amount of Cu, Sb, Mn, Si, P, Ni, and Cr added in an artificial condensate water solution including 10% sulfuric acid.

When specifically examined, in the effects of the aqueous sulfuric acid solution on the corrosion resistance, the low-alloy and corrosion-resistant steel typically secures corrosion resistance by adding alloy components in an amount of about 3 wt % or less, and is compared with stainless steel to which Cr in an amount of about 11 wt % or more is added. After an ingot was prepared by adding each of the alloy components, the effects of alloy component to be added were determined by using a flat plate test specimen prepared after the ingot was subjected to hot rolling-cold rolling processes. FIG. 5 is a graph illustrating the corrosion rate according to the amount of Cu, Sb, Mn, Si, P, Ni, and Cr added in an artificial condensate water solution including 10% sulfuric acid, and indicates a correlation of adding a component in an aqueous condensate solution including 10% sulfuric acid at 80° C. More specifically, FIG. 5 illustrates the corrosion rate according to the amounts of Cu, Sb, Mn, Si, P, Ni, and Cr added based on OCu disposed at the end on the left side of the graph. The OCu is said to be a basic alloy steel (SPCC(KS D 3512)) in this evaluation, and includes 0.002 wt % of C, 0.002 wt % of Si, 0.082 wt % of Mn, 0.012 wt % of P, 0.005 wt % of S, 0.032 wt % of Ti, and 0.010 wt % of Nb. In a test in which effects of corrosion were evaluated by performing an alloy design based on the weight data, the corrosion rate was obtained by measuring the weight and thickness before and after the alloy steel was immersed in an aqueous sulfuric acid solution for 6 hours. However, scales produced after the immersion was measured after a film was formed by using hydrochloric acid. Accordingly, as illustrated in FIG. 5, it can be confirmed that the components most significantly affecting the corrosion rate are Cu and Sb.

Effects of Addition of Cu Alloy Components

The potential of Cu is generally often used in corrosion-resistant steel because the potential is higher than the hydrogen reduction potential. Cu exhibits a rapid decrease in corrosion rate even though being added in an amount of 0.05 wt % to the low-alloy and corrosion-resistant steel of the present invention, and exhibits the highest corrosion resistance at a content of 0.3 wt %. If the content of Cu is more than 0.3 wt %, there is a problem in that the corrosion rate is again increased, so that in an exemplary embodiment of the present invention, it is preferred that Cu is included in an amount of 0.05 wt % to 0.3 wt %.

Effects of Addition of Sb Alloy Components

In FIG. 5, it is possible to confirm the corrosion rate of the low-alloy and corrosion-resistant steel for a vehicle according to the content of Sb. Sb is an alloy component which increases the corrosion resistance in an aqueous sulfuric acid solution because Sb also has a potential higher than the hydrogen reduction potential. In particular, Sb has a significant effect of improving the corrosion resistance in an aqueous sulfuric acid solution at a low concentration. For the effect, Sb is reprecipitated on the surface to form a film, thereby serving to control the anode, and electrons generated from the anode are consumed to suppress a reaction in which hydrogen is generated (cathodic control), thereby lowering the corrosion rate. However, when Sb is added in excess, there is a problem in that Sb is concentrated on the surface to cause surface defects, and furthermore, lead to liquid metal embrittlement (LME), and as a result, the processability indices n and r values are decreased, thereby leading to deterioration in moldability. Accordingly, in an exemplary embodiment of the present invention, it is preferred that a combined content of Sb and Sn alloy components which are catalytic poison components is more than 0 wt % and 0.2 wt % or less.

Other Component Effects

As illustrated in FIG. 5, there is a significant effect of an increase in corrosion resistance as the amounts of Cu and Sb added are increased, and there is a slight effect of an increase in corrosion resistance as the amounts of Mn, S, and Sn added are increased. Further, it can be confirmed that as the amount of P added is increased, the corrosion rate is significantly increased, and the corrosion resistance is slightly decreased when the amounts of Ni and Cr added are increased. However, since Si and Mn significantly affect the material quality of a material, the content of Si alloy components and the content of Mn alloy components in an exemplary embodiment of the present invention are preferably 0.01 wt % to 0.5 wt % and 0.1 wt % to 0.6 wt %, respectively, and the preferred contents are to improve corrosion resistance caused by exhaust gases and satisfy the material quality. As the amount of P added is increased, a very high increase in corrosion rate is exhibited, so that the amount of P added is preferably more than 0 wt % and 0.18 wt % or less, and since oxides of Cr and Ni are solubilized in sulfuric acid, it is preferred to add more than 0 wt % and 0.03 wt % or less of Cr and 0.05 wt % to 0.2 wt % of Ni, which are each equal to or less than those of the tramp management components. Since Nb alloy components serve to delay the rate at which metal is dissolved through the micronization of crystal grains, it is preferred to include Nb in an amount of 0.001 wt % to 0.03 wt % in an exemplary embodiment of the present invention. C is an alloy component which affects elongation, moldability, and the like. The present invention is a low-alloy and corrosion-resistant steel of a vehicle and applied to baffles, inner pipes, and inner cells of an automobile, and in an exemplary embodiment of the present invention, it is preferred to include C in an amount of more than 0.001 wt % and 0.1 wt % or less for the high-quality appearance and moldability of an automobile muffler suitable for the use, and the elongation of the present invention is preferably 30% to 45%.

Figure 6:
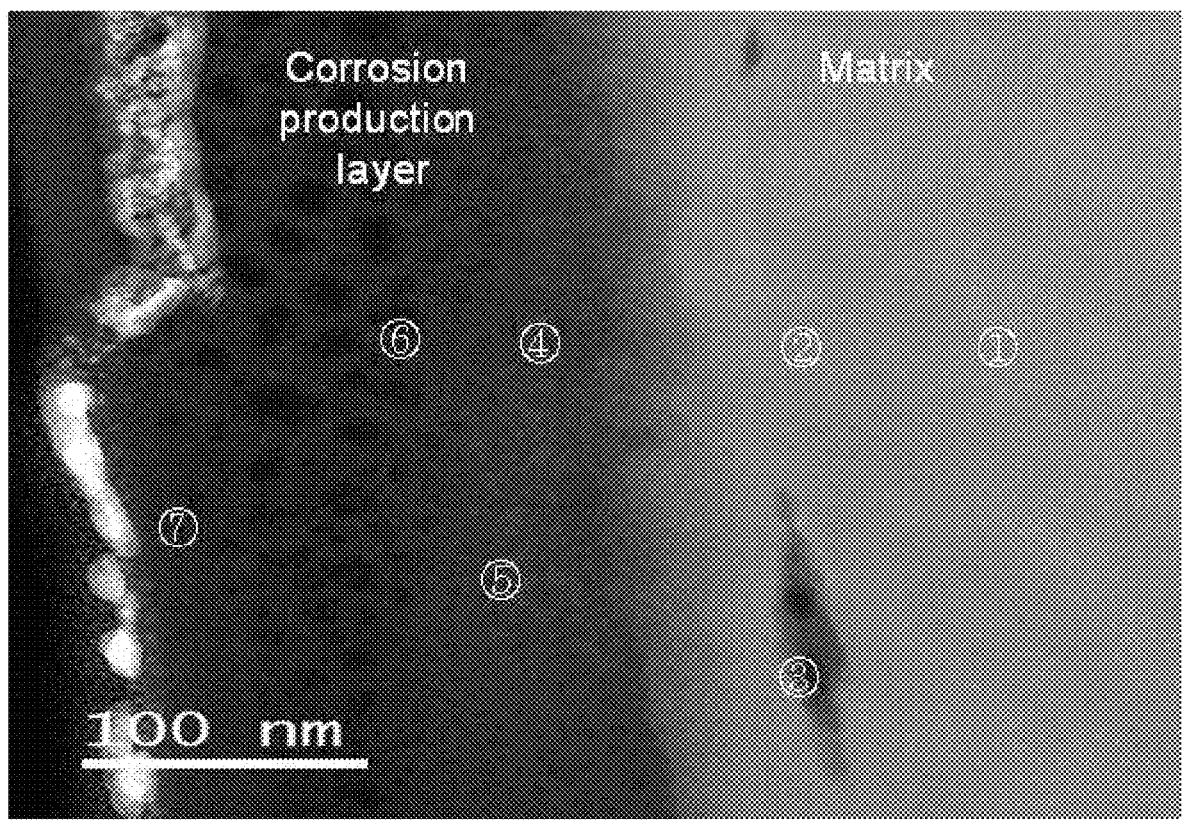
FIG. 6 is an enlarged photograph illustrating a dislocation after a corrosion experiment of a low-alloy and corrosion-resistant steel for a vehicle by means of a sulfuric acid solution.

Meanwhile, FIG. 6 is an enlarged photograph illustrating a single layer after a corrosion experiment of a low-alloy and corrosion-resistant steel for a vehicle by means of a sulfuric acid solution. As illustrated in FIG. 6, it can be confirmed that Position ① and Position ② correspond to a matrix, and are formed of Fe and Si. In contrast, it is possible to confirm the corresponding components of Position ③ to Position ⑦, which correspond to corrosion product layers, and it can be confirmed that the components of S and O are increased at Position ⑥ and Position ⑦, which are the positions of the surface. That is, when approaching the surface, it can be confirmed that an $FeSO_4$ film is formed by corrosion.

Next, when alloy components are added in order to improve the corrosion resistance, if the effects at high temperature, that is, the effects of alloy components on high-temperature corrosion resistance are examined, oxidation at high temperature, that is, the high-temperature oxidation has a mechanism different from corrosion caused by an aqueous solution. As to the corrosion in an aqueous solution, the transfer and consumption of electrons are exhibited by reaction of $H_2O$ or $O_2$ and H, and in the high-temperature oxidation, $O_2$ in the atmosphere directly serves the role. The oxidation rate, that is, the corrosion rate is also significantly lower than the corrosion rate in an aqueous solution, effects caused by the components may also be exhibited differently, and Si, Cu, and P, which are added components of weatherability steel, are representative.

Figure 7:
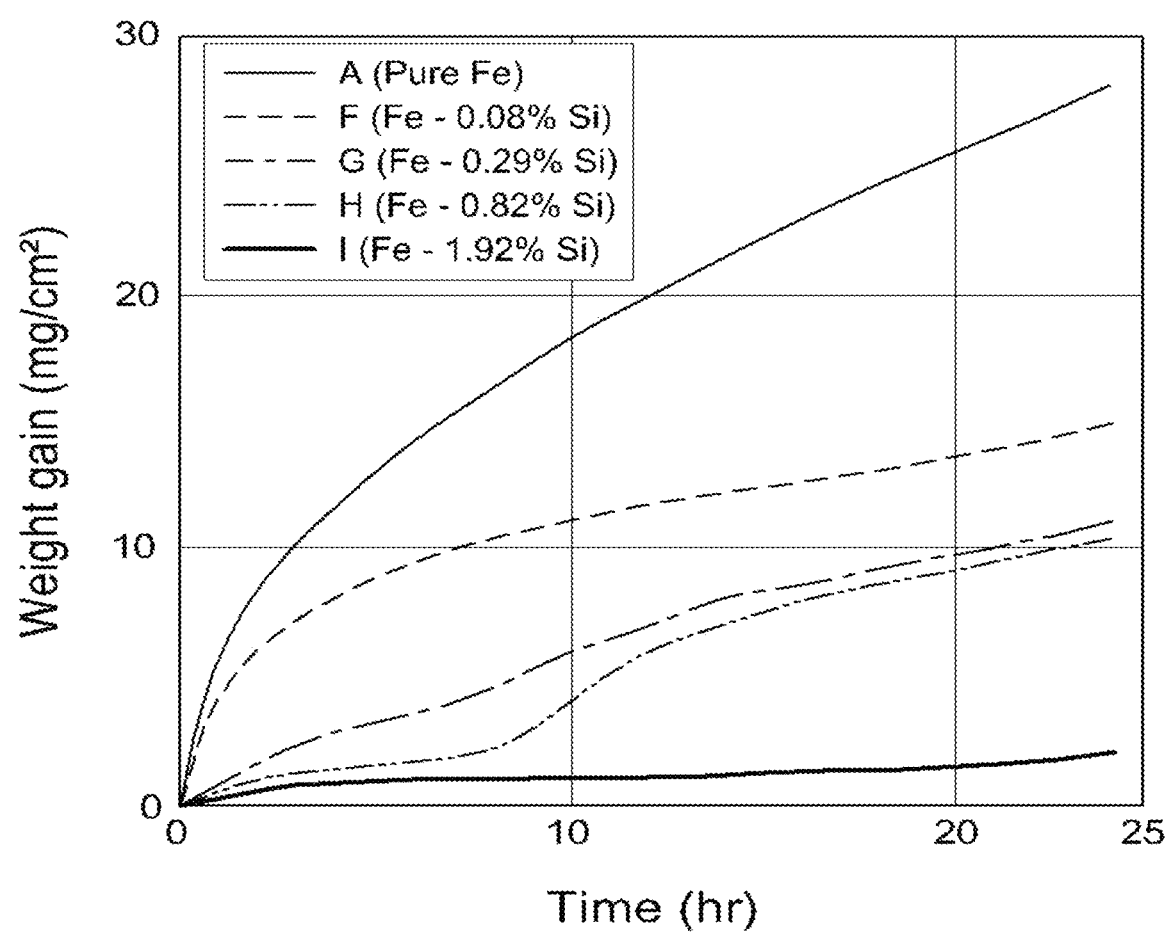
FIG. 7 is a graph illustrating a weight increased by oxidation at 700° C. according to the content of Si.

FIG. 7 is a graph illustrating a weight increased by oxidation at 700° C. according to the content of Si. As illustrated in FIG. 7, it can be confirmed that as the amount of Si alloy components added is increased, the corrosion rate is decreased, and as a result, an amount of increase in weight is decreased.

Figure 8:
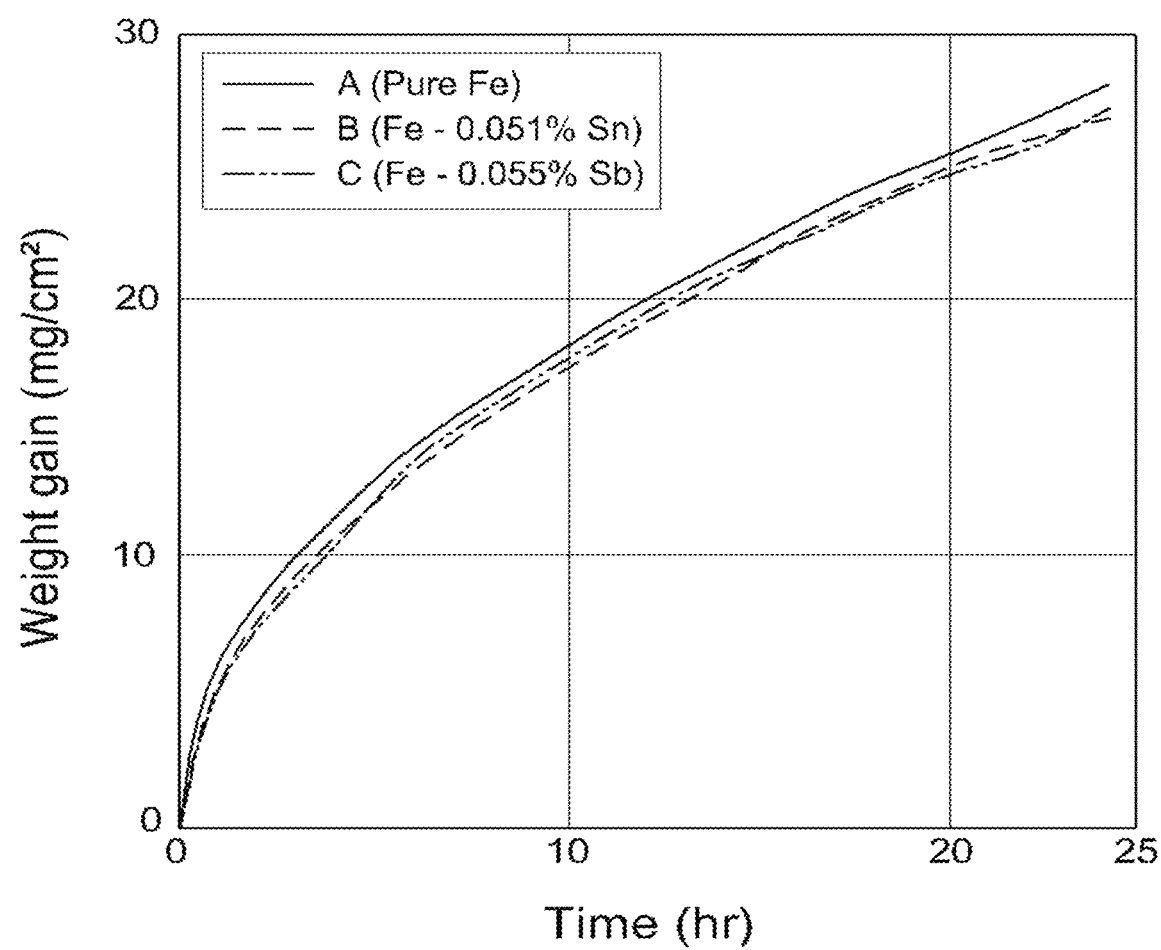
FIG. 8 is a graph illustrating a weight increased by oxidation at 700° C. according to the addition of Sb or Sn.

FIG. 8 is a graph illustrating a weight increased by oxidation at 700° C. according to the addition of Sb or Sn. As illustrated in FIG. 8, it can be confirmed that even when pure iron includes 0.05 wt % of Sn or 0.05 wt % of Sb, a change in weight is not significant.

Figure 9:
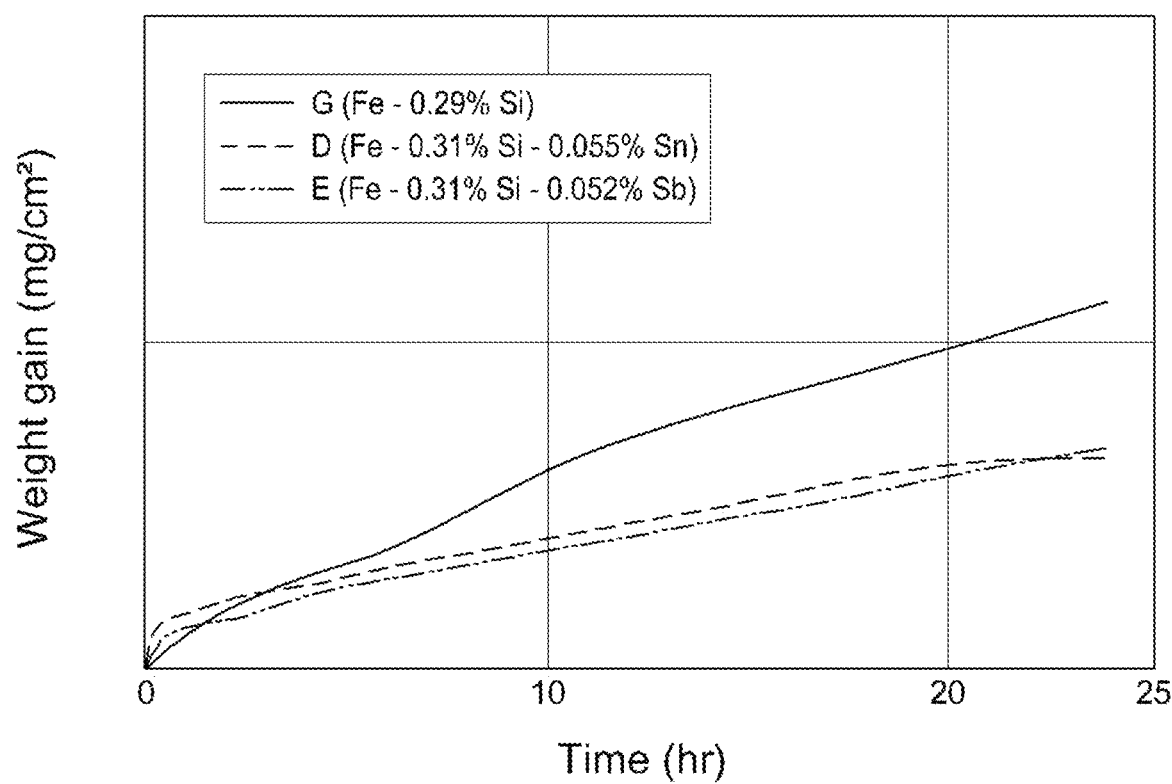
FIG. 9 is a graph illustrating a weight increased by oxidation at 700° C. according to the addition of Sb or Sn when 0.03 wt % of Si is included.

However, when Si alloy components and Sb alloy components or Sn are added to pure iron, the production rate of oxides at high temperature is decreased, and FIG. 9 is a graph illustrating a weight increased by oxidation at 700° C. according to the addition of 0.05 wt % of Sb or 0.05 wt % of Sn when 0.03 wt % of Si is included. As illustrated in FIG. 9, when pure iron includes 0.03 wt % of Si, it can be confirmed that the production rate of oxides at high temperature is decreased according to the addition of 0.05 wt % of Sb or 0.05 wt % of Sn.

Figure 10:
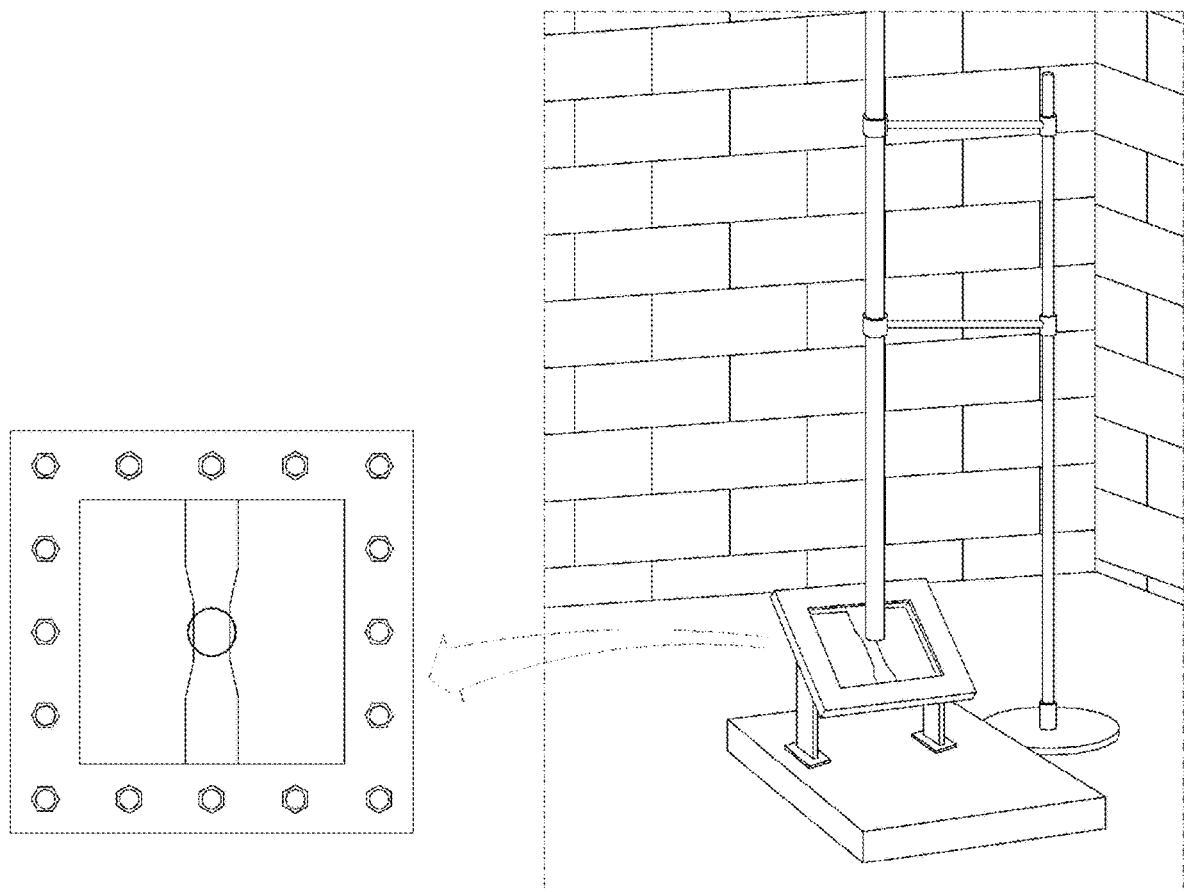
FIG. 10 is a photograph illustrating an installation form of a sound insulation tester.
Figure 11:
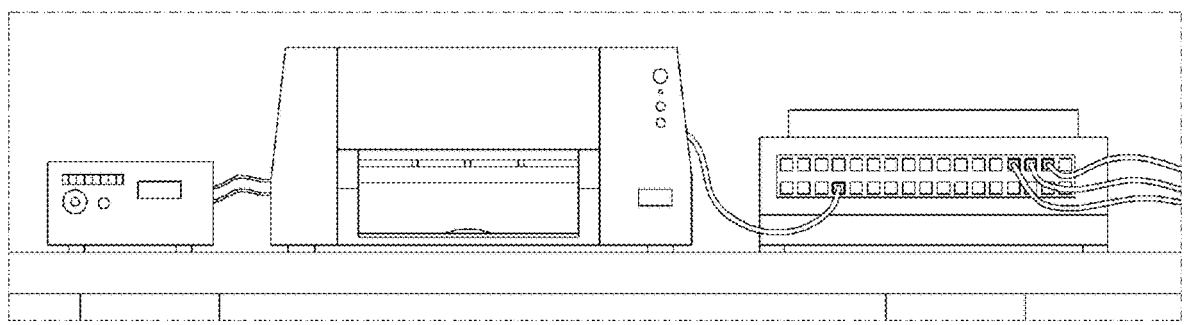
FIG. 11 is a photograph illustrating a noise analysis device.
Figure 12:
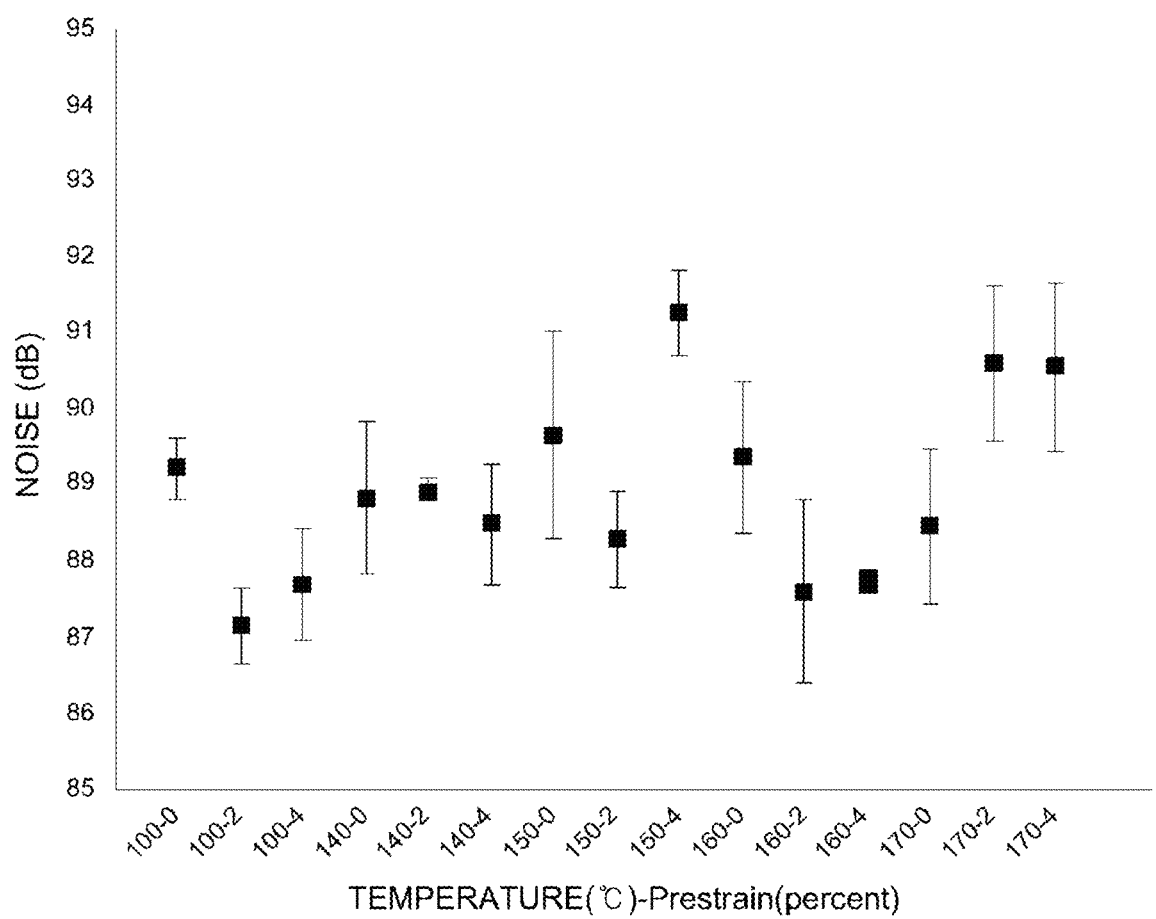
FIG. 12 is a graph illustrating noise according to the temperature and prestrain.

In an exemplary embodiment of the present invention, noise, vibration, and harshness are further considered. FIG. 10 is a photograph illustrating an installation form of a sound insulation tester. Further, FIG. 11 is a photograph illustrating a noise analysis device. In an exemplary embodiment of the present invention, the strength of a low-alloy and corrosion-resistant steel was determined by reflecting a result of measuring noise generated by dropping a marble with a weight of 2.08 g from a height of 2 m by means of a sound insulation tester, as illustrated in FIG. 10. FIG. 12 is a graph illustrating noise according to the temperature and prestrain. As illustrated in FIG. 12, in a sound insulation test result, as strength or hardness is increased by temperature and prestrain, the noise was increased by 2 db to 5 db. Accordingly, in an exemplary embodiment of the present invention, it is preferred to include Mn in an amount of 0.1 wt % to 0.6 wt %. Further, in an exemplary embodiment of the present invention, the average tensile strength is preferably 350 MPa to 450 MPa.

Meanwhile, various aspects of the present invention are directed to providing a low-alloy and corrosion-resistant steel for a vehicle, having improved corrosion resistance under a corrosive environment, and a preparation method thereof, and the present invention in another aspect thereof relates to a method for preparing a low-alloy and corrosion-resistant steel for a vehicle, having improved corrosion resistance under a corrosive environment.

Figure 18:
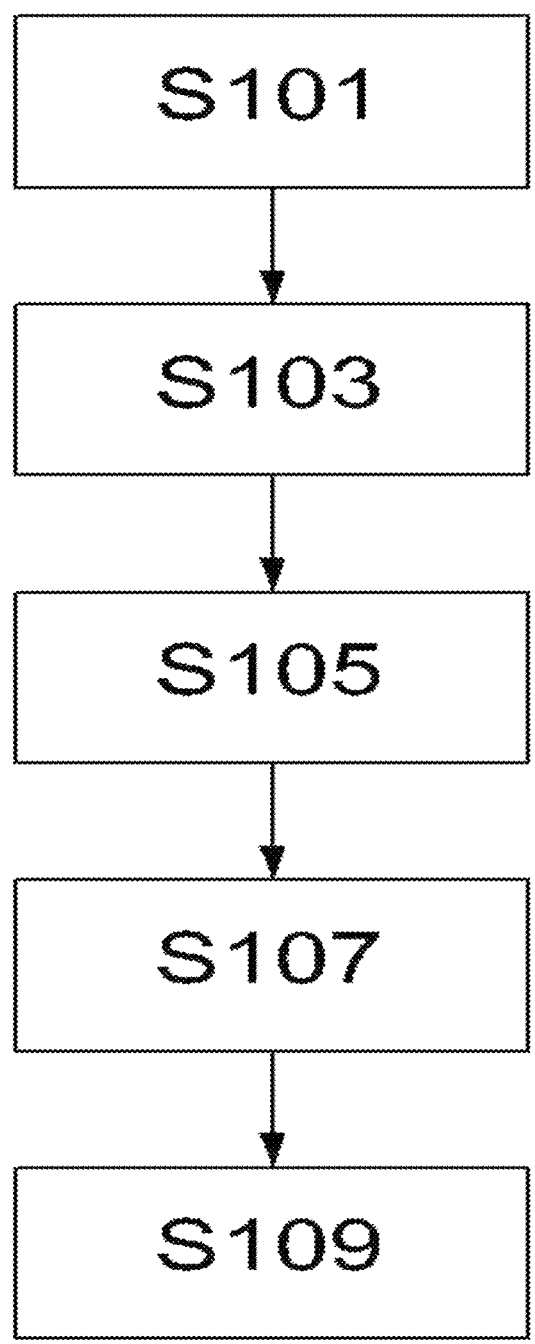
FIG. 18 is a flowchart of a method for preparing a low-alloy and corrosion-resistant steel according to an Example of the present invention.

When specifically examined, FIG. 18 is a flowchart of a method for preparing a low-alloy and corrosion-resistant steel according to an example of the present invention. Provided is a method for preparing a low-alloy and corrosion-resistant steel for a vehicle, the method including: a hot-rolling step (S101) of hot-rolling the low-alloy and corrosion-resistant steel; an acid pickling step (S103) of removing iron oxides from the hot-rolled low-alloy and corrosion-resistant steel; and a cold-rolling step (S105) of cold-rolling the acid pickled low-alloy and corrosion-resistant steel.

In an exemplary embodiment of the present invention, the slab reheating temperature (SRT) in the hot-rolling step is preferably about 950° C. to about 1,250° C. (e.g., about 950° C. to about 1,250° C., about 1,000° C. to about 1,250° C., about 1,000° C. to about 1,250° C., about 1,100° C. to about 1,250° C., about 950° C. to about 1,150° C., about 950° C. to about 1,050° C., about 950° C. to about 1,000° C., about 950° C. to about 975° C., and the like) and the finishing delivery temperature (FDT) in the hot-rolling step is preferably about 800° C. to about 950° C. (e.g., about 800° C. to about 950° C., about 800° C. to about 850° C., about 900° C. to about 950° C., and the like). Further, the cooling rate in the hot-rolling step is preferably shear cooling, and the coiling temperature (CT) in the hot-rolling step is preferably about 100° C. to about 740° C. (e.g., about 100° C. to about 740° C. about 200° C. to about 740° C., about 300° C. to about 740° C., about 400° C. to about 740° C., about 500° C. to about 740° C., about 600° C. to about 740° C., about 700° C. to about 740° C., about 400° C. to about 640° C., about 400° C. to about 540° C., about 400° C. to about 500° C., and the like). Furthermore, a structure in the hot-rolling step is preferably ferrite pearlite (FP), and a thickness in the hot-rolling step is preferably 3 mm to 4 mm.

In an exemplary embodiment of the present invention, a hydrochloric acid concentration in the acid pickling step is preferably about 17% or more (e.g., 17%, 18%, 19%, 20%, or more), and a temperature in the acid pickling step is preferably about 75° C. to about 85° C. (e.g., about 75° C., about 76° C., about 77° C., about 78° C., about 79° C., about 80° C., about 81° C., about 82° C., about 83° C., about 84° C., and about 85° C.).

In an exemplary embodiment of the present invention, a reduction ratio in the cold-cooling step is preferably about 50% or more (e.g., 50%, 51%, 52%, 53%, 55%, 56%, 60% 70%, or more), an annealing temperature in the cold-rolling step is preferably about 600° C. to about 860° C. (e.g., about 600° C. to about 860° C., about 700° C. to about 860° C., about 800° C. to about 860° C., about 600° C. to about 760° C., about 600° C. to about 700° C., about 600° C. to about 800° C., about 600° C. to about 660° C., and the like), and a heat treatment method in the cold-rolling step is preferably is a batch annealing furnace (BAF) or a continuous annealing furnace line (CAL).

In an exemplary embodiment of the present invention, the method further includes: a plating step (S107) of plating the low-alloy and corrosion-resistant steel after the cold-rolling step, it is preferred that a plating thickness in the plating step is about 1 μm to about 50 μm (e.g., about 1 μm to about 50 μm, about 5 μm to about 50 μm, about 10 μm to about 50 μm, about 20 μm to about 50 μm, about 30 μtm to about 50 μm, about 40 μm to about 50 μm, about 1 μm to about 40 μm, about 1 μm to about 30 μm, about 1 μm to about 20 μm, about 1 μm to about 10 μm, and the like), and it is preferred that a plating raw material in the plating step includes more than 0 wt % and less than about 3 wt % of Mg (e.g., more than 0 wt %, about 0.1 wt %, about 0.5 wt %, about 1 wt %, about 2 wt %, about 3 wt %, and the like of Mg) and about 5 wt % to about 15 wt % of Si (e.g., about 5 wt %, about 6 wt %, about 7 wt %, about 8 wt %, about 9 wt %, about 10 wt %, about 11 wt %, about 12 wt %, about 13 wt %, about 14 wt %, and about 15 wt % of Si), and the balance Al and inevitable impurities. In this case, Si is an element which affects oxidation resistance and corrosion resistance, and as can be seen through FIGS. 6 and 6, as the content of Si is increased, the oxidation resistance is increased, so that the content of Si is preferably 5 wt % or more. However, when the content of Si is very high, the embrittlement of a plating layer becomes so strong that the plating layer is broken during the processing, and a slurry problem occurs in the plating pot management, and as a result, it is preferred that the content of Si is 15 wt % or less.

The amount of plating raw material plated onto the low-alloy and corrosion-resistant steel is preferably about 10 g/m$^2$ to about 800 g/m$^2$ (e.g., about 10 g/m$^2$ to about 800 g/m$^2$, about 500 g/m$^2$ to about 800 g/m$^2$, about 100 g/m$^2$ to about 800 g/m$^2$, about 150 g/m$^2$ to about 800 g/m$^2$, about 200 g/m$^2$ to about 800 g/m$^2$, about 250 g/m$^2$ to about 800 g/m$^2$, about 300 g/m$^2$ to about 800 g/m$^2$, about 350 g/m$^2$ to about 800 g/m$^2$, about 400 g/m$^2$ to about 800 g/m$^2$, about 500 g/m$^2$ to about 800 g/m$^2$, about 600 g/m$^2$ to about 800 g/m$^2$, about 10 g/m$^2$ to about 500 g/m$^2$, about 10 g/m$^2$ to about 200 g/m$^2$, about 10 g/m$^2$ to about 100 g/m$^2$, and the like), and a plating temperature in the plating step is preferably about 650° C. to about 670° C. (e.g., about 650° C., about 655° C., about 660° C., about 665° C., and about 670° C.). In addition, it is preferred that the method further includes: an alloying heat treatment step (S109) of heat-treating the plated low-alloy and corrosion-resistant steel at a temperature of 690° C. to 790° C. after the plating step.

When specifically examined, an alloy component for improving the corrosion resistance in the low-alloy and corrosion-resistant steel of the present invention corresponds to Cu and Sb. Cu has a melting point of 1,085° C. and Sb has a melting point of 630.6° C. In contrast, the melting point of iron corresponds to 1,538° C. Accordingly, in order to improve the quality of the surface during a hot-rolling step, that is, a hot-rolling and a cold-rolling step, that is, a cold-rolling, after the continuous casting, there is a need for managing the rolling temperature and the cooling rate and controlling a reduction ratio (an introducing thickness to a product thickness). Further, in an exemplary embodiment of the present invention, it is preferred that an Al—Si plating is applied in order to prevent galvanic corrosion and crevice corrosion, and it is preferred that a raw material used for the plating includes Si in an amount of 5 wt % to 15 wt %. In this case, Si is an element which affects oxidation resistance and corrosion resistance, and as can be seen through FIGS. 6 and 8, as the content of Si is increased, the oxidation resistance is increased, so that the content of Si is preferably about 5 wt % or more (e.g., 5 wt %, 6 wt %, 7 wt %, 8 wt %, 9 wt %, 10 wt %, or more). However, when the content of Si is very high, the embrittlement of a plating layer becomes so strong that the plating layer is broken during the processing, and a slurry problem occurs in the plating pot management, and as a result, it is preferred that the content of Si is about 15 wt % or less (e.g., 15 wt %, 14 wt %, 13 wt %, 12 wt %, 11 wt %, 10 wt %, 9 wt %, 8 wt %, 7 wt %, 6 wt %, or less). Furthermore, it is preferred to additionally include Mg in an amount of 0 wt % to 3 wt % (e.g., 0 wt % to 3 wt %, 0 wt % to 2.5 wt %, 0 wt % to 2 wt %, 0 wt % to 1.5 wt %, 0 wt % to 1 wt %, 0.1 wt % to 3 wt %, 0.1 wt % to 2 wt %, 0.1 wt % to 1 wt %, or 0.5 wt % to 3 wt %) according to the corrosive environment caused by an Al alloy added.

EXAMPLES

Hereinafter, the present invention will be described in more detail through Examples. These Examples are only for exemplifying the present invention, and it will be obvious to those skilled in the art that the scope of the present invention is not interpreted to be limited by these Examples.

Figure 13:
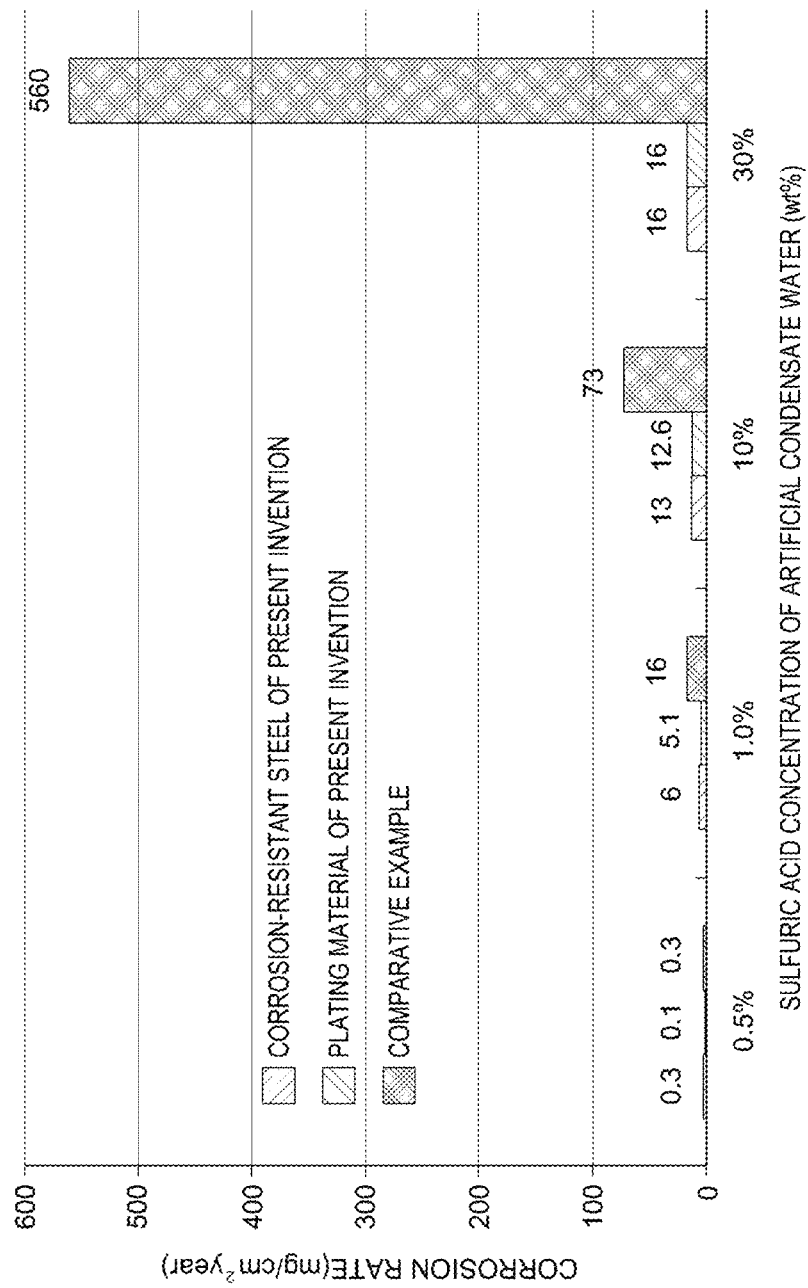
FIG. 13 is a graph illustrating the corrosion rate of an Example according to an exemplary embodiment of the present invention and a Comparative Example being the related art according to the concentration of aqueous sulfuric acid solution.

FIG. 13 is a graph illustrating the corrosion rate of an Example according to an exemplary embodiment of the present invention and the Comparative Example being the related art according to the concentration of aqueous sulfuric acid solution. In the Example according to an exemplary embodiment of the present invention, it can be confirmed that at low and high concentrations of sulfuric acid, that is, a concentration of 0.5 wt % and 30 wt % or less, the low-alloy and corrosion-resistant steel and the Al alloy plating material, which are Examples of the present invention, have better corrosion resistance than the Comparative Example being the related art, that is, STS409L.

Figure 14:
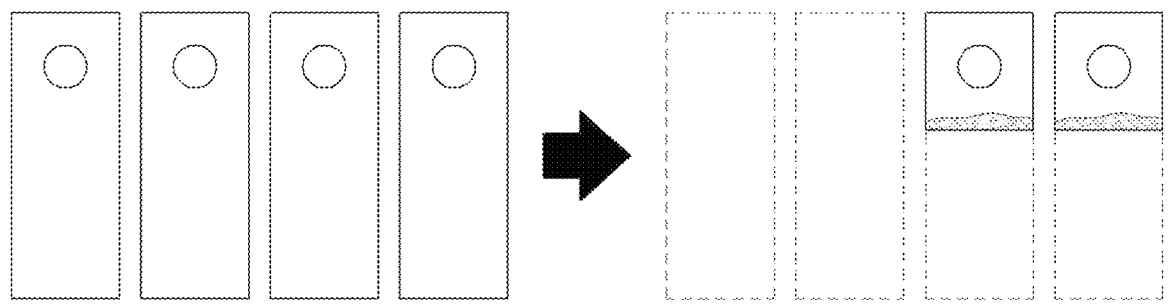
FIG. 14 is a schematic view comparing the aspects before and after immersing Comparative Example 1 according to the related art in an artificial condensate water.
Figure 15:
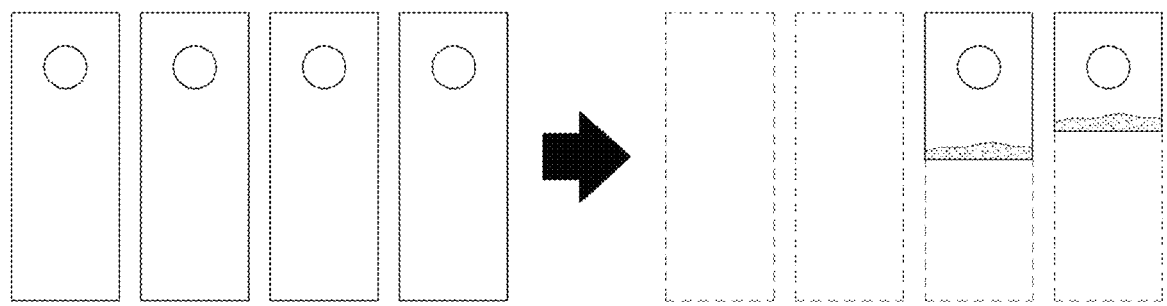
FIG. 15 is a schematic view comparing the aspects before and after immersing Comparative Example 2 according to the related art in an artificial condensate water.
Figure 16:
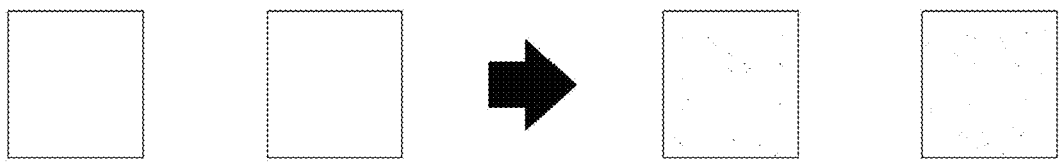
FIG. 16 is a schematic view comparing the aspects before and after immersing the Example according to an exemplary embodiment of the present invention in an artificial condensate water.

FIG. 14 is a schematic view comparing the aspects before and after immersing Comparative Example 1 according to the related art in an artificial condensate water. As illustrated in FIG. 14, it can be confirmed that in STS409L being the related art, that is, Comparative Example 1, two test specimens completely immersed in the artificial condensate water are completely dissolved and lost due to a reaction, and two test specimens half immersed in the artificial condensate water have the immersed portion dissolved. Furthermore, FIG. 15 is a schematic view comparing the aspects before and after immersing Comparative Example 2 according to the related art in an artificial condensate water. As illustrated in FIG. 15, it can be confirmed that in STS439L being the related art, that is, Comparative Example 2, two test specimens completely immersed in the artificial condensate water are completely dissolved and lost due to a reaction, and two test specimens half immersed in the artificial condensate water have the immersed portion dissolved. In contrast, FIG. 16 is a schematic view comparing the aspects before and after immersing the Example according to an exemplary embodiment of the present invention in an artificial condensate water. In an Example of the present invention, it can be confirmed that two specimens are formed and completely immersed, but the shape is maintained while the specimens are not dissolved even after time elapses. Furthermore, the artificial condensate water in FIGS. 14 to 16 were used at the same concentration of 10%.

Figure 17:
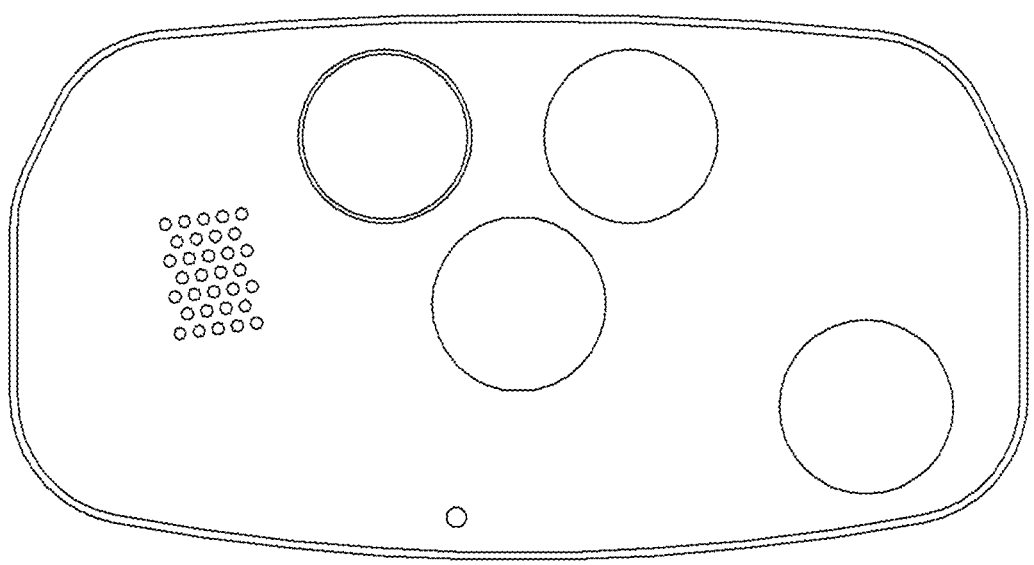
FIG. 17 is a photograph of a muffler part formed of a low-alloy and corrosion-resistant steel according to an Example of the present invention.

Meanwhile, FIG. 17 is a photograph of a muffler part formed of a low-alloy and corrosion-resistant steel according to an Example of the present invention. Even though a part, that is, a muffler is formed by the low-alloy and corrosion-resistant steel of the present invention, it can be confirmed that the moldability is excellent because cracks or wrinkles are not formed as illustrated in FIG. 17.

The present invention has an effect of reducing the costs by about 20% to about 40% (e.g., about 20% to about 40%, about 20% to about 38%, about 20% to about 35%, about 20% to about 30%, about 25% to about 40%, about 30% to about 40%, and the like) as compared to stainless steel being the related art by reducing the addition amount of alloy component included in the related art.

The present invention has advantages in that by omitting expensive alloy components included in the related art, determining an alloy component included according to the property of each alloy component, and simultaneously adjusting the rolling temperature, the cooling rate, and the reduction ratio during the preparation process, the corrosion resistance of a vehicle is improved under a corrosive environment, noise and vibration are reduced, preparation costs are low, the stability and long life time of a material are achieved, and the range in which the material is applied is extended.

As described above, the present invention has been described in relation to specific exemplary embodiments of the present invention, but the specific exemplary embodiments are only illustration and the present invention is not limited thereto. Exemplary embodiments described may be changed or modified by those skilled in the art to which the present invention pertains without departing from the scope of the present invention, and various alterations and modifications are possible within the technical spirit of the present invention and the equivalent scope of the claims which will be described below.

What is claimed is:

1. A low-alloy and corrosion-resistant steel for a vehicle, comprising:
about 0.001 wt % to about 0.1 wt % of C, about 0.01 wt % to about 0.5 wt % of Si, about 0.1 wt % to about 0.6 wt % of Mn, more than 0 wt % and about 0.18 wt % or less of P, more than 0 wt % and less than about 0.02 wt % of S, about 0.001 wt % to about 0.03 wt % of Nb, more than 0 wt % and about 0.03 wt % or less of Cr, about 0.05 wt % to about 0.3 wt % of Cu, about 0.05 wt % to about 0.2 wt % of Ni, about 0.05 wt % to about 0.1 wt % of Sn and about 0.05 wt % to about 0.15 wt % of Sb, and the balance iron and inevitable impurities,
wherein the low-alloy and corrosion-resistant steel includes Cu-Sb layer,
wherein the low-alloy and corrosion-resistant steel is plated with a Al based material, and
wherein the Al based material comprises more than 0 wt % and less than about 3 wt % of Mg, about 5 wt % to about 15 wt % of Si, and the balance Al and inevitable impurities.

2. The low-alloy and corrosion-resistant steel of claim 1, wherein the low-alloy and corrosion-resistant steel has a tensile strength of about 350 MPa to about 450 MPa.

3. The low-alloy and corrosion-resistant steel of claim 1, wherein the low-alloy and corrosion-resistant steel has a yield point of about 200 MPa to about 400 MPa.

4. The low-alloy and corrosion-resistant steel of claim 1, wherein the low-alloy and corrosion-resistant steel has an elongation of about 30% to about 45%.

5. The low-alloy and corrosion-resistant steel of claim 1, wherein a microstructure of the low-alloy and corrosion-resistant steel is ferrite.

6. The low-alloy and corrosion-resistant steel of claim 1, wherein the low-alloy and corrosion-resistant steel has a plating thickness of about 1 μm to about 50 μm.

7. The low-alloy and corrosion-resistant steel of claim 1, wherein an amount of the Al based material plated onto the low-alloy and corrosion-resistant steel is about 10 g/m$^2$ to about 800 g/m$^2$.

8. A method for preparing a low-alloy and corrosion-resistant steel for a vehicle, the method comprising:
a hot-rolling step of hot-rolling the low-alloy and corrosion-resistant steel of claim 1;
an acid pickling step of removing iron oxides from the hot-rolled low-alloy and corrosion-resistant steel; and
a cold-rolling step of cold-rolling the acid pickled low-alloy and corrosion-resistant steel.

9. The method of claim 8, wherein a structure in the hot-rolling step is ferrite pearlite (FP).

10. The method of claim 8, wherein a thickness in the hot-rolling step is about 3 mm to about 4 mm.

11. The method of claim 8, wherein a hydrochloric acid concentration in the acid pickling step is about 17% or more.

12. The method of claim 8, wherein a temperature in the acid pickling step is about 75° C. to about 85° C.

13. The method of claim 8, wherein an annealing temperature in the cold-rolling step is about 600° C. to about 860° C.

14. The method of claim 8, wherein a heat treatment method in the cold-rolling step is a batch annealing furnace (BAF) or a continuous annealing furnace (CAF).

15. The method of claim 8, further comprising: a plating step of plating the low-alloy and corrosion-resistant steel after the cold-rolling step.

16. The method of claim 15, wherein a plating temperature in the plating step is about 650° C. to about 670° C.

17. The method of claim 15, further comprising: an alloying heat treatment step of heat-treating the plated low-alloy and corrosion-resistant steel at a temperature of about 690° C. to about 790° C. after the plating step.

* * * * *